United States Patent Office 3,312,075
Patented Apr. 4, 1967

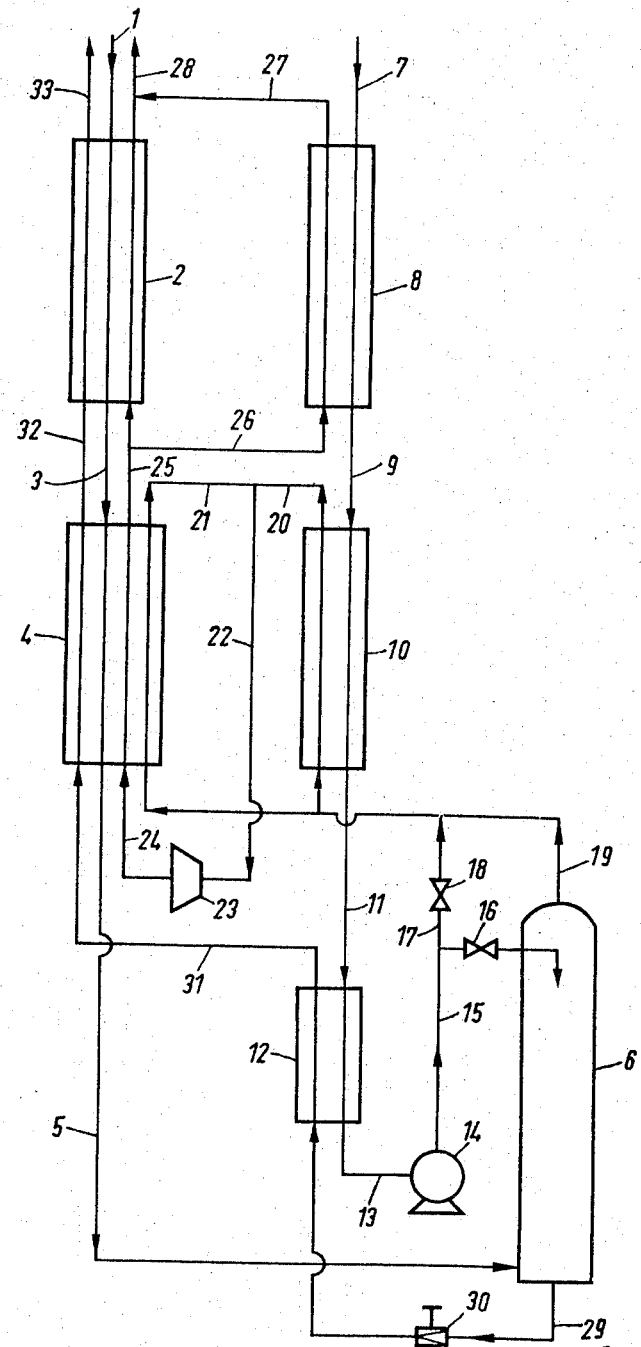

3,312,075
PROCESS OF LIQUID NITROGEN CONTACT WITH HYDROGEN CONTAINING GASEOUS MIXTURE IN AMMONIA SYNTHESIS
Rudolf Becker, Munich-Solln, Germany, assignor to Linde Aktiengesellschaft, Wiesbaden, Germany
Filed Apr. 20, 1964, Ser. No. 360,950
Claims priority, application Germany, Apr. 27, 1963, G 37,612
6 Claims. (Cl. 62—20)

The present invention relates to a process and apparatus for removing impurities from gaseous mixtures rich in hydrogen, and more particularly to the purification of said gaseous mixtures by washing with liquid nitrogen.

When separating gases, such as coke-oven gas, into their components, it has been customary to free the gaseous mixtures first from water vapor and carbon dioxide, and also from hydrocarbons should any be present, and thereafter to remove any final impurities present, such as carbon monoxide, by washing with liquid nitrogen, in order to obtain hydrogen gas of a purity suitable for synthesis purposes. In carrying out the above purification process nitrogen, which ordinarily is available in gaseous form, is first compressed to the pressure used in the gas scrubber where the gas is to be treated. By suddenly releasing the pressure additional cooling is obtained with the result that a gas pressure of about 120 atmospheres is obtained. This nitrogen is subjected to heat exchange with the pure gas leaving the gas scrubber with the result that its temperature is lowered and the gas is liquefied. This liquid nitrogen has then been fed into the head of the scrubbing column, or the nitrogen pressure has been released. A process of this type requires the expenditure of large quantities of energy.

The process of the present invention permits the gas scrubbing operation to be carried out with the expenditure of much less energy than in the prior processes. According to the improved procedure of the present invention the gaseous nitrogen is liquefied under heat exchange with the product evaporating from the sump of the gas scrubbing column, at a pressure sufficient to bring about liquefaction, and then brought by the aid of a pump to the pressure of the gas scrubbing column, where it is fed into the head of the column in the form of a liquid.

Because of the fact that, in comparison to gaseous nitrogen, liquefied nitrogen occupies a small more or less incompressible volume, the amount of energy required by the liquid pump is much less than the amount required by the corresponding compressor for gaseous nitrogen. The use of high-pressure compressors, which often present difficulties because the conduits in the system become clogged due to entrained droplets of lubricating oil hardened at the temperatures existing in the system, is rendered unnecessary in the process of the present invention. When it is desired to prepare gas mixtures for ammonia synthesis, the process of the present invention presents an added advantage in that nitrogen is liquefied in an amount in excess of that required for the scrubbing of the hydrogen gas, part of the liquid nitrogen being passed by the aid of a pump into the scrubbing column, and the remainder into the pure gas conduit for reevaporation.

In order to avoid evaporation losses it is desirable that the liquid nitrogen used for the hydrogen scrubbing be supercooled by a heat exchange with the product from the scrubber sump at a pressure above that at which it is released.

Still another advantage of the process of the present invention results from the fact that the liquefaction of the nitrogen used for the gas scrubbing operation is effected at least in part by a heat exchange with the reevaporation of nitrogen injected as liquid into the pure gas conduit.

Accordingly, all that is required for the liquefaction of the nitrogen used for the gas scrubbing is a pressure of 2–10 atmospheres absolute, with a pressure in the scrubbing column of, as a rule, only 6–30 atmospheres absolute. It is obvious, therefore, that the savings in energy are quite large when using the process of the present invention.

The additional cold required for the low cooling of the raw gases and for the nitrogen required for the scrubbing, for compensating the heat radiated into them from the surroundings, is generated in accordance with the process of the present invention by preheating the raw gas by heat exchange with nitrogen and/or crude gas from which the water vapor and the carbon dioxide have been previously removed and then subjecting it to pressure release under performance of work, and before the pure gas is heated to the temperature of the surroundings by another heat exchange step.

The following example is given to illustrate the operation of the improved process of the present invention employing the apparatus of the appended drawing. It is specifically understood, however, that the process of the present invention is not limited to the specific details shown as it will be obvious to one skilled in the art that that various minor modifications therefrom can be made without departing from the concept of the invention covered by the appended claims.

Crude hydrogen-containing gas obtained from any customary source such as coke ovens, etc. was first treated by any customary method to remove water vapor and carbon dioxide, and then compressed to approximately 26 atmospheres absolute (25 atmospheres gauge). The gas was then passed through conduit 1 into the heat exchanger 2, and from there through conduit 3 into the heat exchanger 4, from which it was conveyed through conduit 5 into the lower portion of the scrubbing column 6. The gas entering through conduit 1 at approximately atmospheric temperature was cooled to approximately 83° K. on passage through the heat exchangers 2 and 4.

The amount of nitrogen required for scrubbing the raw gas and for the synthesis of ammonia was then introduced through conduit 7 in the gaseous state under a pressure of 3–4 atmospheres. This nitrogen gas then passed through the heat exchange 8, conduit 9, heat exchanger 10 and conduit 11 into the liquefier 12, the size of the heat exchangers 8 and 10 being determined by the inlet temperature of the nitrogen being used.

The liquid nitrogen, cooled to a temperature of approximately 83° K. passed through the conduit 13 into the pump 14 by which it was fed through conduit 15 and regulating valve 16 into the head of the scrubbing column 6, maintained at a pressure of approximately 25 atmospheres absolute.

A portion of the liquid nitrogen sufficient for ammonia synthesis passed through the conduit 17 with its regulating valve 18 into the pure-gas conduit 19 coming from the head of the scrubbing column 6. The pure-gas conduit 19 was connected to the heat exchangers 4 and 10, inside of which occured the evaporation of the injected liquid nitrogen and some preheating of the pure gas. The exit lines 20 and 21 from the heat exchangers 4 and 10 were connected to conduit 22 which conducted the preheated pure-gas mixture to the expansion turbine 23 and then at a pressure of about 18 atmospheres absolute back through the conduit 24 into the heat exchanger 4, where it released the cold generated by the expansion under performance of work in the turbine. The outlet conduit 25 conducted the pressure reduced pure gas partially through the heat exchanger 2, and partially through conduit 26, heat exchanger 8 and conduit 27 to the common outlet conduit 28, where the gas arrived at approximately the temperature of the surroundings and at approximately 17 atmospheres absolute.

The liquid nitrogen which carried the impurities which were to be removed, left the sump of the scrubbing column 6 through conduit 29 provided with pressure-release valve 30, and arrived through liquefier 12 and conduit 31 at a temperature of approximately 80° K., from which it passed to the heat exchanger 4, conduit 32, and the heat exchanger 2 and then to outlet 33. The nitrogen carrying the impurities was released at this point at approximately atmospheric pressure or slightly higher, and at ordinary temperature.

What is claimed is:

1. In a process for the removal of impurities from hydrogen-containing raw gas mixture by scrubbing with liquid nitrogen and producing a gas mixture suitable for ammonia synthesis, the steps which comprise liquefying nitrogen gas in an amount greater than the amount required for the removal of the impurities from said raw gas mixture, said liquefaction being effected under a pressure sufficient for its liquefaction and under heat exchange with evaporating product from the sump of the scrubber in which said gas scrubbing is taking place; bringing resultant liquefied nitrogen to the pressure of said scrubber, the latter pressure being higher than the nitrogen liquefaction pressure, and feeding part of said liquid nitrogen at said latter pressure into the head of said scrubber and mixing another part with pure gas leaving the head of the scrubber; preheating said pure gas and evaporating liquid nitrogen mixed therewith by heat exchange with precooled raw gas mixture and nitrogen gas to be liquefied; conducting resultant preheated pure gas mixture containing evaporated liquid nitrogen through an expansion turbine; and then passing the resultant expanded, cooled pure gas mixture in further heat exchange partially with nitrogen to be liquefied entering the system and partially with raw gas from which water vapor and carbon dioxide have been removed.

2. A process as defined by claim 1 wherein the liquefied nitrogen is supercooled by heat exchange with the product from the scrubber sump after pressure reduction of said product, and further comprising passing resultant warmed sump product in indirect heat exchange with said raw gas.

3. a process as defined by claim 1, further comprising passing the resultant expanded, cooled pure gas mixture in heat exchange partially with said preheated pure gas mixture before turbine expansion of the latter.

4. A process as defined by claim 2, further comprising passing the resultant expanded, cooled pure gas mixture in heat exchange partially with said preheated pure gas mixture before turbine expansion of the latter.

5. Apparatus for the removal of impurities from hydrogen-containing gases by scrubbing with liquid nitrogen comprising a gas scrubber the sump of which is connected across pressure reducing valve means with the cold end of the flow path of a first heat exchanger, and the cold end of the other flow path of said heat exchanger being connected with the inlet of a pump for liquid scrubbing nitrogen, and the pressure connection of said pump being connected by two conduits, one of said conduits being connected to the head of the pressure column, and the other said conduit being connected to the pure-gas conduit coming from the head of the scrubber, a regulating valve being placed in at least one of said two conduits, a group of additional heat exchangers being connected to the warm end of said first heat exchanger, which group of additional heat exchangers serves first for cooling the gas which is to be scrubbed by heat exchange with the head and sump products of said scrubber, and for precooling of said scrubbing nitrogen by heat exchange with the head product of the scrubber and conduits for the respective connections; and an expansion engine, said expansion engine being connected by conduit to the group of additional heat exchangers and to the pure-gas conduit, whereby additional refrigeration is obtained in the pure-gas stream.

6. The apparatus of claim 5 wherein the pure-gas conduit is serially connected in order, first to the group of additional heat exchangers, then to the inlet side of the expansion engine, and then from the outlet side of the expansion engine back to said group of additional heat exchangers, whereby the pure-gas product is heated, cooled, and reheated.

References Cited by the Examiner
UNITED STATES PATENTS

| | | | |
|---|---|---|---|
| 1,830,610 | 11/1931 | Linde | 62—23 X |
| 1,913,805 | 6/1933 | Hausen | 62—23 X |
| 2,936,593 | 5/1960 | Grunberg. | |

NORMAN YUDKOFF, *Primary Examiner.*

V. W. PRETKA, *Assistant Examiner.*